(12) United States Patent
Gifford et al.

(10) Patent No.: US 9,894,075 B2
(45) Date of Patent: Feb. 13, 2018

(54) SERVICE TO PROVIDE NOTIFICATION OF MAILING ADDRESS CHANGES

(71) Applicant: INTERNATIONAL BUSINESS MACHINES CORPORATION, Armonk, NY (US)

(72) Inventors: Wesley M. Gifford, Ridgefield, CT (US); Nianjun Zhou, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 236 days.

(21) Appl. No.: 14/824,796

(22) Filed: Aug. 12, 2015

(65) Prior Publication Data

US 2017/0048250 A1 Feb. 16, 2017

(51) Int. Cl.
*H04L 29/06* (2006.01)
*G06F 9/54* (2006.01)

(52) U.S. Cl.
CPC .............. *H04L 63/102* (2013.01); *G06F 9/54* (2013.01)

(58) Field of Classification Search
CPC ................................ H04L 63/102; G06F 9/54
USPC ............................................................ 726/4
See application file for complete search history.

(56) References Cited

U.S. PATENT DOCUMENTS

| 6,549,892 | B1 | 4/2003 | Sansone |
| 7,130,803 | B1 | 10/2006 | Couch et al. |
| 8,126,822 | B1 | 2/2012 | Sansone et al. |
| 8,195,575 | B2 | 6/2012 | Krause et al. |
| 2004/0068518 | A1 | 4/2004 | McDowell |
| 2004/0254893 | A1* | 12/2004 | Tsuei ............... G06Q 10/08 705/74 |
| 2008/0040269 | A1 | 2/2008 | Deans et al. |
| 2008/0208611 | A1 | 8/2008 | Krooss |
| 2014/0058970 | A1 | 2/2014 | Amato et al. |

FOREIGN PATENT DOCUMENTS

CN 101465821 6/2009

* cited by examiner

*Primary Examiner* — Hadi Armouche
*Assistant Examiner* — Angela Holmes
(74) *Attorney, Agent, or Firm* — F. Chau & Associates, LLC

(57) ABSTRACT

A method of managing access to a physical mailing address using a virtual mailing address is presented. The method includes: setting up a proxy system as a server, assigning, by a server, a virtual mailing address identifier to natural or juristic person that registers with the server; linking, by the server, a physical mailing address entered by the user to the virtual mailing address identifier to generate the virtual mailing address; and enabling, by the server, a second natural person to manually access the physical mailing address when the server determines that the second user has permission to access the virtual mailing address; enabling, by the server, an institute or business (juristic person) to access the physical mailing address automatically using an Application programming interface (API) through a computer system when the server determines that the second user has permission to access the virtual mailing address.

17 Claims, 8 Drawing Sheets

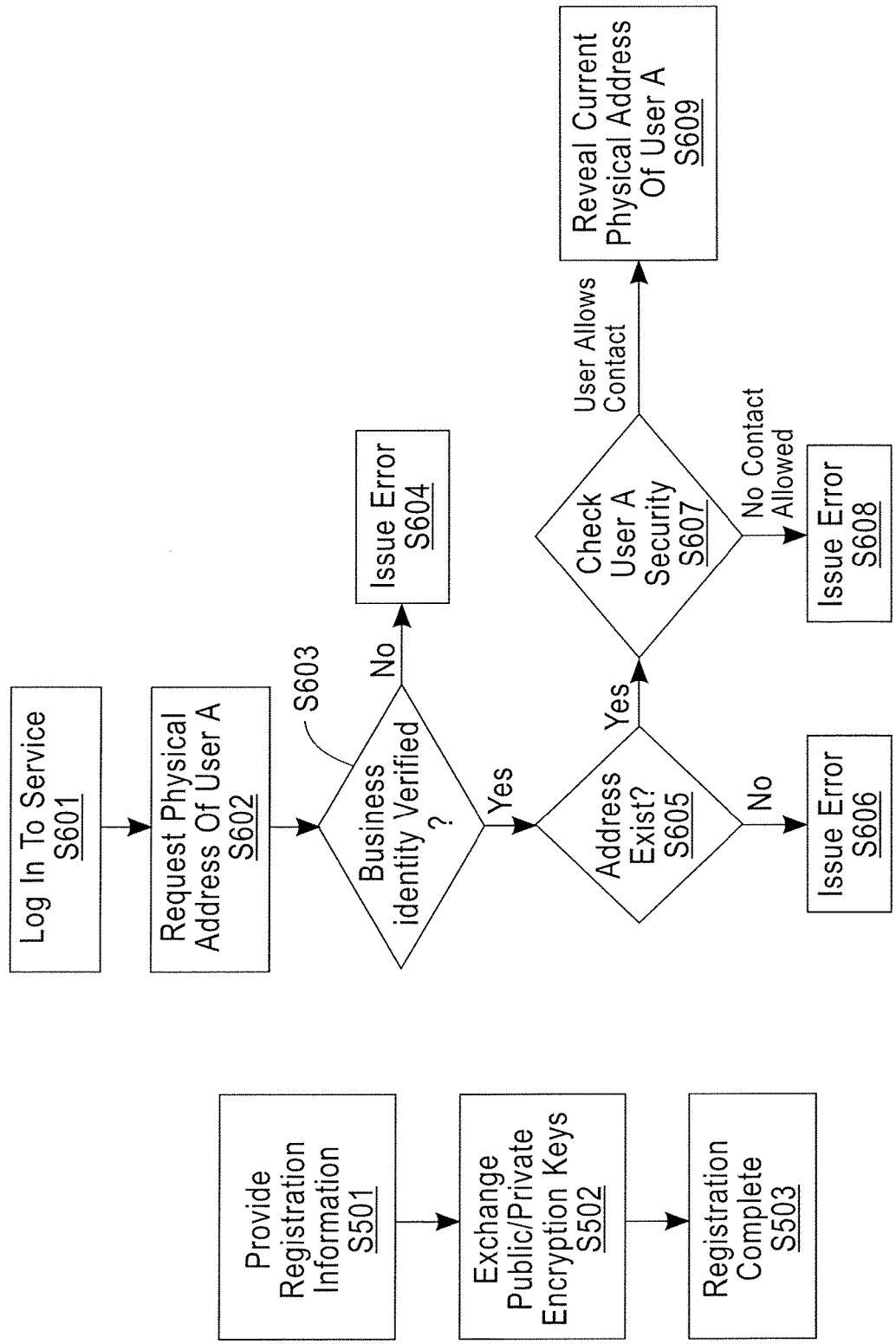

SERVICE TO PROVIDE NOTIFICATION OF MAILING ADDRESS CHANGES

BACKGROUND

1. Technical Field

The present disclosure relates to a service to provide notification of mailing address changes, and more particularly to methods and systems to provide notification of mailing address changes before delivery to avoid mail rerouting and loss.

2. Discussion of Related Art

Currently, when a party (e.g., an individual person or a family) relocates to a new address, they need to go to the post office to formally request that mail be routed from their previous address to the new address for a specific period of time by filling out a form. Further, since the relocating party is currently receiving mail from multiple parties (e.g., credit card companies, banks, stores, utilities, acquaintances, etc.), they need to contact each party to notify them of the change of address to ensure that future correspondence (e.g., statements, bills, letters, advertisements) are properly routed. When mail arrives at the postal office for the relocating party that is labeled with the previous address, the post office needs to apply a new label to the mail with the new address so it can be routed to the new address. This process is tedious, time consuming, and inefficient.

Thus, there is a need for methods and systems that can make the routing of mail more efficient.

BRIEF SUMMARY

According to an exemplary embodiment of the invention, a method of maintaining an accurate physical mailing address using a virtual mailing address is presented. The method includes: assigning, by a server, a virtual mailing address identifier to a first user that registers with the server; linking, by the server, a physical mailing address entered by the first user to the virtual mailing address identifier to generate the virtual mailing address; and enabling, by the server, a second user to access the physical mailing address when the server determines that the second user has permission to access the virtual mailing address. The second user could be a natural person or an institute or business, the method will support different mechanisms with security control to maintain the accurate physical mailing address used.

According to an exemplary embodiment of the invention, a computer server is configured to maintain virtual mailing addresses and manage access to physical mailing addresses associated with the virtual mailing addresses. The server includes: a memory storing a computer program; a database storing the virtual mailing addresses for each user, wherein each virtual mailing address includes a virtual mailing address identifier and a physical mailing address; a network controller configured to enable the server to communicate across a computer network; and a processor configured to execute the computer program. The computer program is configured to enable a user to logon to the server across the network to create a new virtual mailing address or update the physical mailing address of an existing virtual mailing address of the user, and to access the physical mailing address of other users using the virtual mailing address identifier of the other users.

According to an exemplary embodiment of the invention, a method of managing access to a physical mailing address of an individual include: a server querying a first user to enter a virtual mailing address identifier of a second user upon the first user logging onto a service of the server; the server setting a status of the second user to pending in a first list associated with the first user when the entered virtual mailing address identifier is valid; the server determining whether a physical mailing address associated with the virtual mailing address identifier is public or private; the server setting the status of the second user in the first list to active upon determining the physical mailing address is public; the server setting the status of the second user in the first list to active upon determining the physical mailing address is private and a process executed at least once indicates a second list associated with the second user includes a virtual mailing address identifier of the first user; and the server presenting the physical mailing address to the first user when the status is set to active.

According to an exemplary embodiment of the invention, a method of managing access to a physical mailing address of a business includes: a server querying a user to enter a business identifier of a business upon the user logging onto a service of the server; the server setting a status of the user to pending in a list associated with the business when the entered business identifier is valid; the server setting the status of the user to active in the list associated with the business when a security preference of the user indicates contact with the business is allowed; the server determining a virtual mailing address identifier associated with the entered business identifier; and the server presenting a physical mailing address associated with the virtual mailing address identifier to the user.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 5 illustrates a method according to an exemplary embodiment of the invention that is used in the system;

FIG. 6 illustrates a method according to an exemplary embodiment of the invention that is used in the system;

DETAILED DESCRIPTION

Embodiments of the present invention relate to methods and/or systems that provide a service to notify of mailing address changes to avoid mail rerouting and loss.

Figure 1:
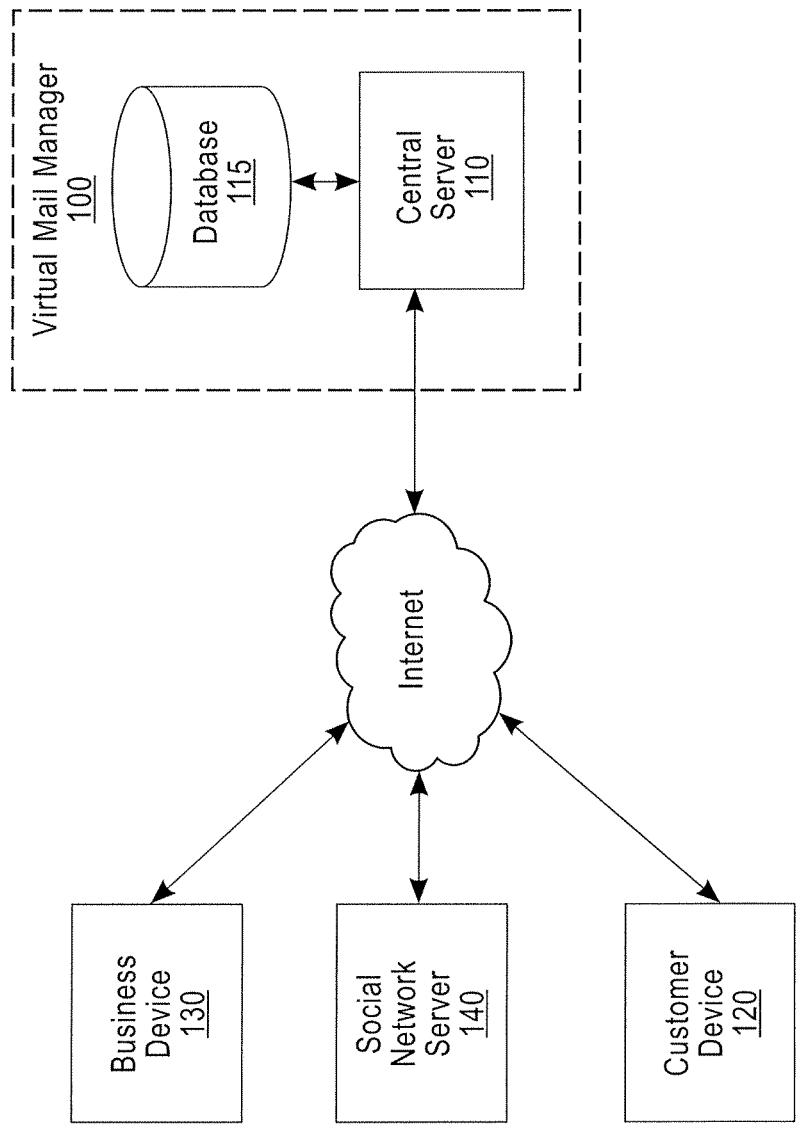
FIG. 1 illustrates a system to assist in the routing of mail according to an exemplary embodiment of the invention.

FIG. 1 illustrates a system according to an exemplary embodiment of the invention. Referring to FIG. 1, the system includes a virtual mail manager 100, one or more customer devices 120, one or more business devices 130, and optionally a social network server 140. The routing manager 100 includes a server 110 and a database 115. The devices and servers are all capable of communicating with one another through the Internet or various other public or private computer networks. Examples of the devices and servers include but are not limited to a smartphone, a tablet computer, and a desktop computer.

The virtual mail manager 100 provides a public service that allows individuals or families to register their moving information. For example, the public service could be operated by authorized public agencies like the Postal Service or an authorized private service company. The authorized service provides unique identifiers, which can be obtained by a registered third party as tokens to check the current mailing address information of its customers. The service reduces the need for mail rerouting caused by relocation events. The service supports a virtual mailing address.

Figure 2:
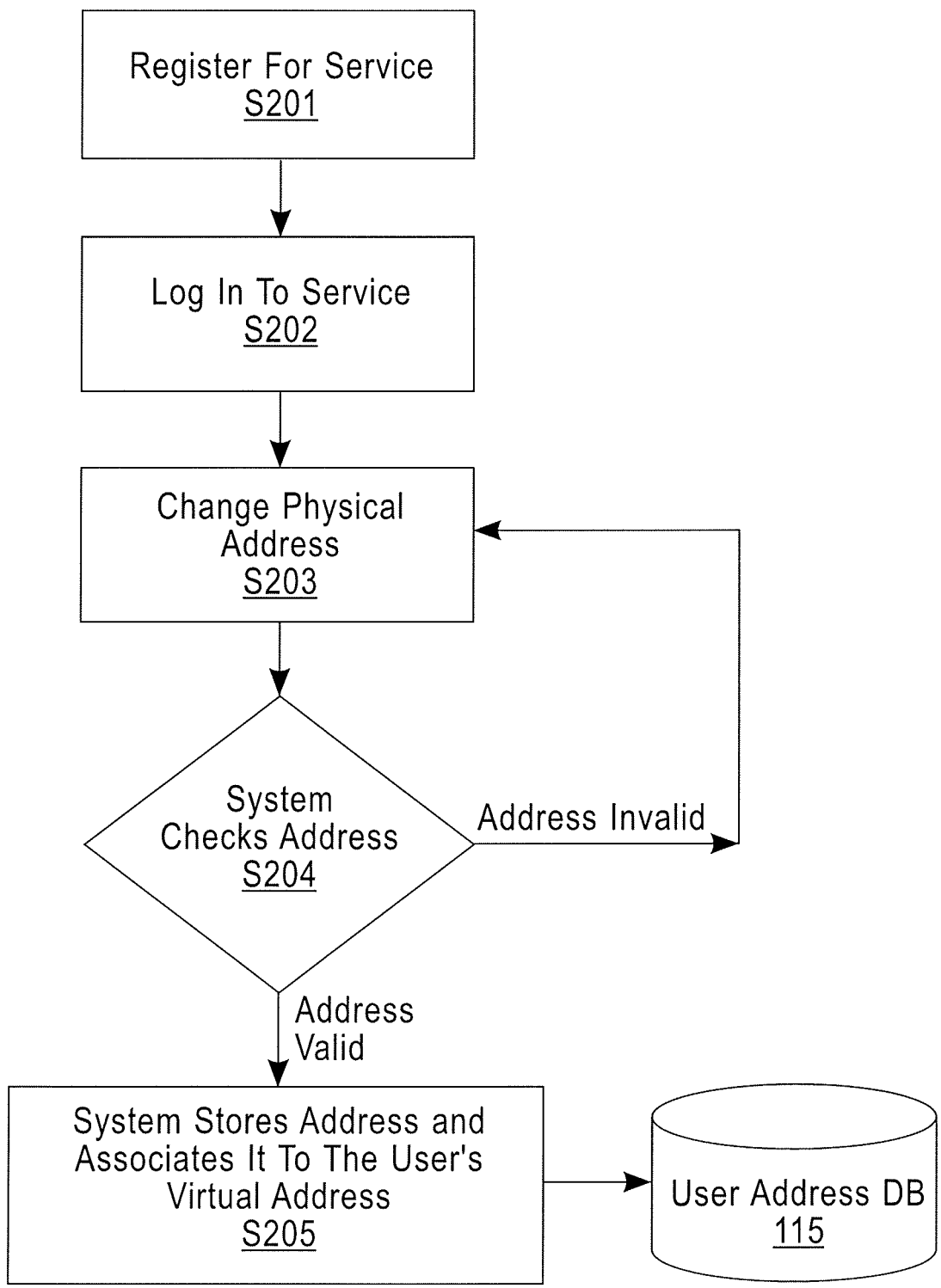
FIG. 2 illustrates a method according to an exemplary embodiment of the invention that is used in the system.

For this service, individuals or families can apply for a virtual mailing address identifier. This identifier can be generated by an online service or provided from a physical office like the Post Office. Referring to FIG. 2, an individual or a family can apply for the virtual mailing address by registering with the online service (S201). For example, the individual or an individual representing the family can use an application on the customer device 120 (e.g., a PC, smart-phone, etc.) to connect across the Internet to the virtual mail manager 100 to apply for the virtual mailing address.

The registration process includes the individual (i.e., the user) providing identifying information to the service. Examples of the identifying information include the social security number, driver license and the name (e.g., first, last, middle name) of the user. The service compares the identifying information against information entered by previous users to determine whether a virtual mailing address identifier has already been assigned to a user matching the same identifying information. If the virtual mailing address identifier has already been assigned, then an error message is output to the user. If the virtual mailing address has not already been assigned, then the service assigns the user a unique virtual mailing address identifier. For example, the database 115 may store a list of unique virtual mailing address identifiers, which indicate whether they have been assigned or not assigned, and then the service can select one of the virtual mailing address identifiers from the list that has not been assigned. During the registration process, the user may also be asked to set a number of preferences, assigned a user identifier, asked to create the user identifier, assigned a password, or asked to create a password. In an exemplary embodiment, the user identifier is the same as the assigned virtual mailing address identifier.

The user then logs onto the service using the user identifier and the password (S202). Once the user is logged into the service, the service provides the user with the ability to set or change their physical mailing address (S203). A physical mailing address is not an e-mail address, but the physical address of a dwelling or post office box, that is capable of receiving physical letters, packages, shipments of products, etc. When the physical mailing address is that of a dwelling, the address may include a house number or apartment number, a street address, a city, a state, a zip code, and a country. The physical mailing address needs to include the minimum amount of information necessary for delivery of physical mail by a particular carrier such as the Post Office or some other delivering party.

If a physical mailing address is not currently assigned to the virtual mailing address identifier, the service may automatically query the user to enter the physical mailing address. If a physical mailing address is currently assigned to the virtual mailing address identifier, the service may automatically query the user to enter a new mailing address or select the new address from a list of available addresses.

When the user enters a new physical mailing address, the service can check the entered physical mailing address to make sure it is a valid address (S204). For example, the system could compare the entered physical mailing address against a database of addresses provided by a government agency such as the postal service to determine whether the entered address is a valid address. If the entered physical mailing address is not valid, the system can notify the user that the address is not valid and request entry of a valid address. An additional check may be performed to determine if mail can be routed or delivered to that physical mailing address, where such validation could be any proof of residence like a copy of a driver license, phone or utility bills. For example, if the system has a copy of a recent utility bill listing the entered physical mailing address, the system can confirm that the entered physical mailing address is valid.

If the physical mailing address is determined to be valid for the user, the system stores the physical mailing address in its internal database 115 and associates (links) it to the user's virtual mailing address (S205). For example, an entry in a table of the database 115 may be created that lists the user's virtual mailing address identifier and the entered physical address. The table may be indexed by the virtual mailing address identifier. The database 115 may also contain the history of past physical addresses entered by the user and other user preferences. The system can be configured to make automatic suggestions for the physical address based on the history when the user indicates a desire to change the physical address. For example, if the user had previously entered addresses of his summer home and his winter home, and the virtual mailing address is currently linked to the physical address of the summer home, upon the user indicating he wishes to change the physical address, the system can suggest that the address be changed to the physical address of the winter home.

Besides the physical mailing address, a set of characteristics can be defined for the physical address, such as the list of valid people names, the expiration time/date of the physical address, and other potential rules. In an exemplary embodiment, one of the rules specifies who is permitted to view the physical address when the virtual address is known. The information could also be made public so that the virtual mailing address identifier and physical address become searchable by the public using the service.

In case of a relocation event or other event requiring a mailing address change, the individual can go online (e.g., using their customer device 120) to make changes to the physical mailing address, without modifying the virtual mailing address identifier. The virtual mailing address identifier keeps consistent to track the proper address for the individual.

If a user wants to send a physical letter to a family member, friend, or an acquaintance, the user can log onto the virtual mail manager 100 to view the latest physical addresses that the user has access to. The physical addresses that a first user has access to may correspond to those of publically accessible virtual mailing address identifiers and those virtual mailing address identifiers of second users that have granted access to the first user. This helps the first user to reduce the chances of using an old or wrong address of the second users.

Figure 3:
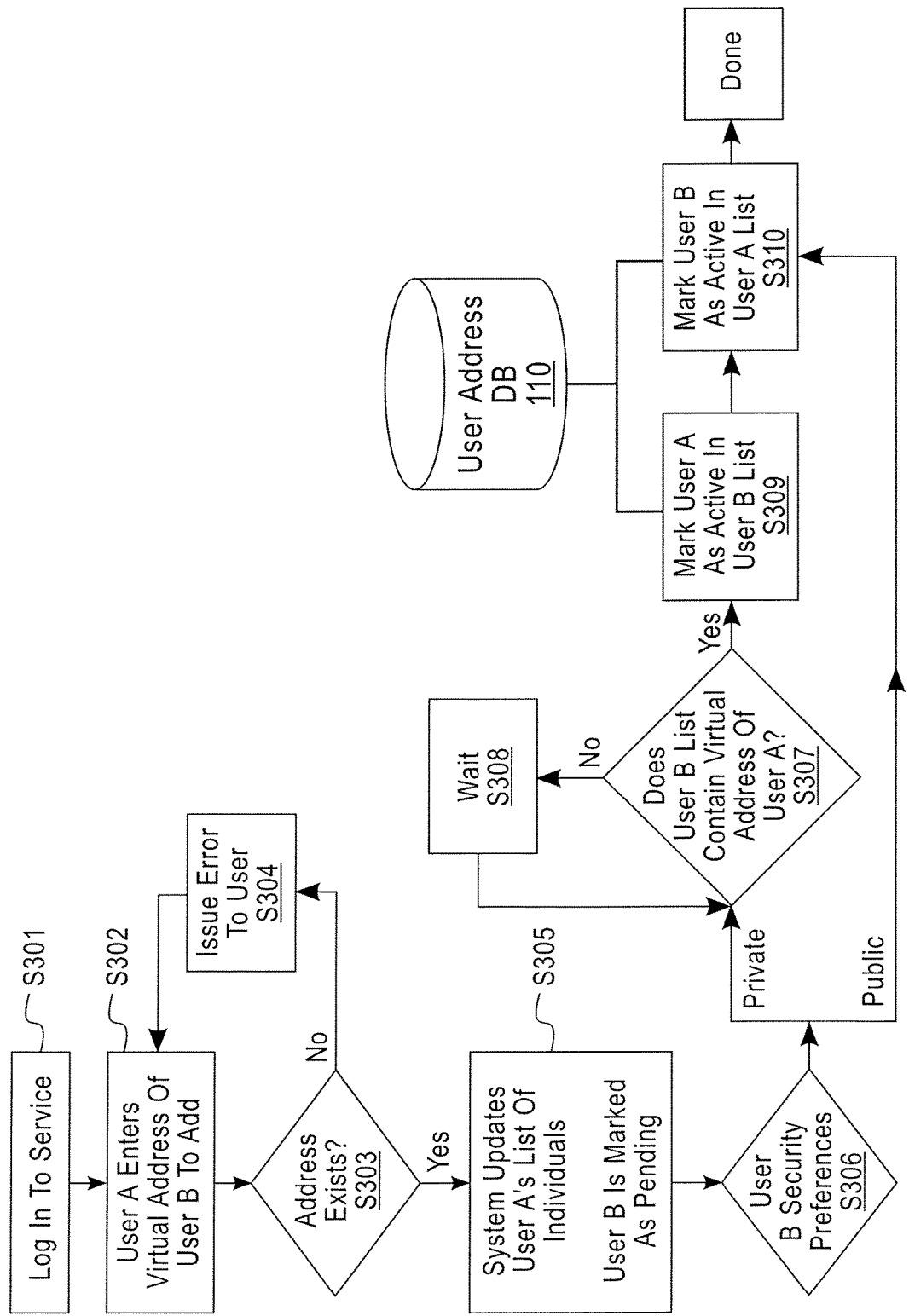
FIG. 3 illustrates a method according to an exemplary embodiment of the invention that is used in the system.

FIG. 3 illustrates a process according to an exemplary embodiment of the inventive concept that enables a first user to access the physical mailing address of a second user (e.g., a friend, a family member, etc). Each user has a list of individuals that they desire to contact stored in the system (e.g., the virtual mail manager 100). Whether or not a new individual is added to that list depends on the security preferences of the new individual. In the most secure setting, two users who wish to communicate are required to supply each other's virtual mailing address identifier.

The process includes the first user (e.g., User A) logging onto the service of the virtual mail manager (S301). The first user can use their customer device 120 to log onto the service of the virtual mail manager 100 using their user identifier and their password.

After the first user has logged on, the first user enters the virtual mailing address identifier of a second user (e.g., User B) (S302). It is assumed that the second user has already communicated his virtual mailing address identifier to the first user (e.g., verbally, through email, a text message, a social network message, etc.) and granted the first user access based on the virtual mailing identifier of the first user.

The virtual mail manager 100 determines whether the entered virtual address identifier exists (S303). For example, the virtual mail manager 100 can compare the entered virtual address identifier against its list of known virtual address identifiers to determine whether the virtual address identifier exists. If the virtual mail manager 100 determines that the virtual address identifier does not exist, an error message is sent to the first user (S304).

In an alternate embodiment, rather than the first user enter the virtual mailing address identifier, the virtual mail manager 100 retrieves the virtual mailing address identifier by interfacing with the social network server 140. For example, if the first user is friends with the second user on a social network, such as FACEBOOK, and the second user has given access to their virtual mailing address identifier to the first user using an application on the social network, the virtual mail manager 100 can interface with that application to determine the virtual mailing address identifier of the second user.

The virtual mail manager 100 updates a list of individuals associated with the first user to include the second user (S305). However, the second user is marked as pending in the list, since access of the first user to the physical mailing address of the second user may be dependent on the first user also granting access of their mailing address identifier to the second user.

The virtual mail manager 100 then determines the security preferences of the second user (S306). For example, the virtual mail manager 100 can uses the virtual mailing address identifier of the second user as an index into a table that lists the security preferences of the second user.

If the security preferences of the second user are private, the process determines whether the list of the second user contains the virtual mailing address identifier of the first user (S307).

If the process determines that the list of the second user does not contain the virtual mailing address identifier of the first user, the process can delay for a period (S308), and periodically re-check whether the list of the second user contains the virtual mailing address identifier of the first user. A process can be run in the background to perform this periodic checking. The process may terminate after a pre-determined number of attempts have been performed.

Once the list of the second user contains the virtual mailing address identifier of the first user, the first user is marked as active in the list of the second user (S309) and the second user is marked as active in the list of the first user (S310). If the security preferences of the second user had been public, the second user is automatically marked as active in the list of the first user.

Once the second user is marked as active in the list of the first user, the virtual mail manager 100 enables the first user to view the physical mailing address of the second user. The first user can use this information to send a physical letter to the correct address of the second user.

In an exemplary embodiment, after the wait period in step S308, but prior to re-determining whether the list of the second user contains the virtual mailing address identifier of the first user in step S308, the virtual mail manager 100 determines whether the security preferences of the second user has changed to public. If such a change has occurred, the process immediately proceeds to step S310 so that the second user is marked as active in the first user's list.

Figure 4:
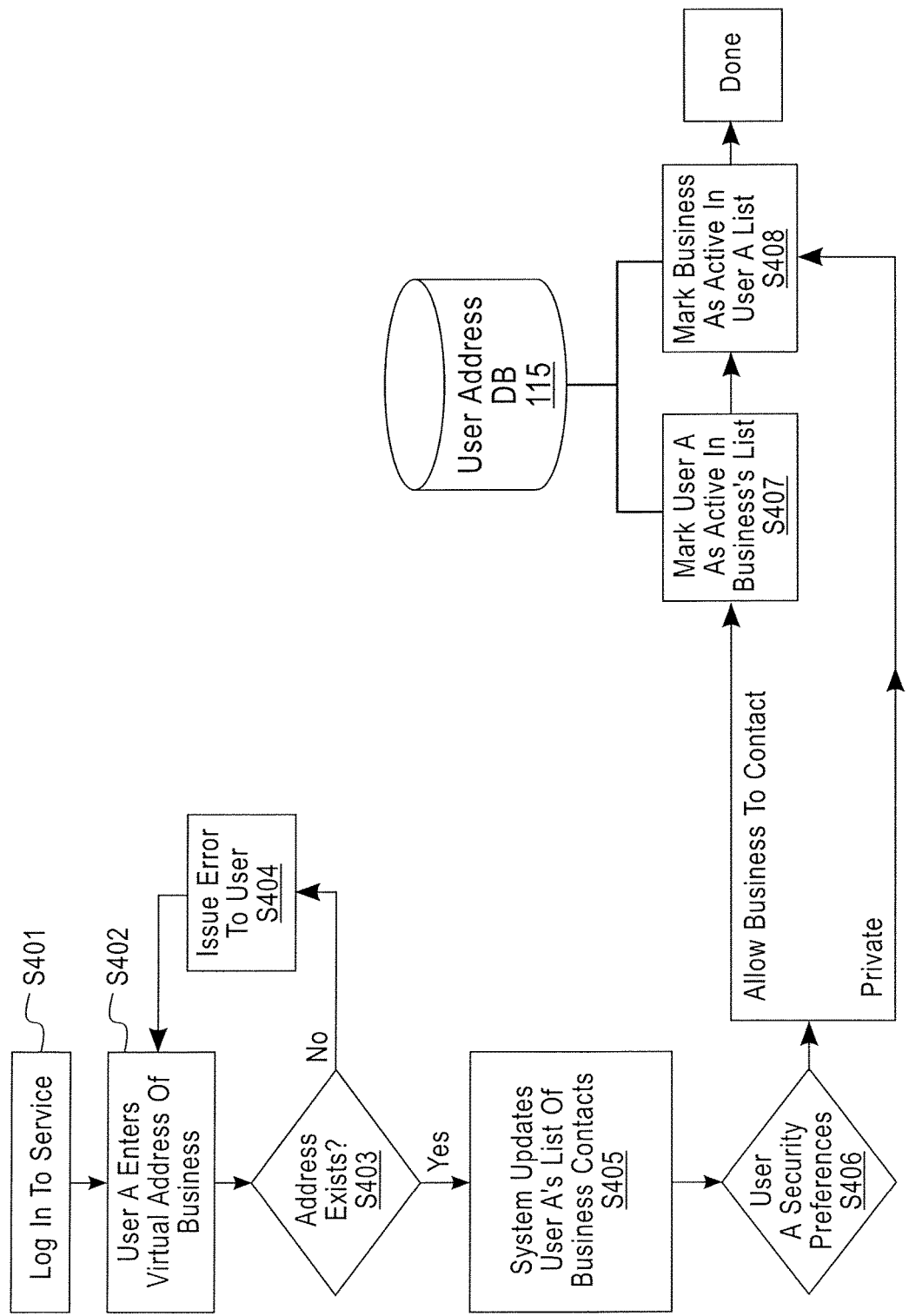
FIG. 4 illustrates a method according to an exemplary embodiment of the invention that is used in the system.

FIG. 4 illustrates a process according to an exemplary embodiment of the invention that can be performed by the system to retrieve the physical mailing address of a business (e.g., an institution with an institutional identifier) for a user.

Referring to FIG. 4, the process includes the user (e.g., user A) logging onto the service of the virtual mail manager 100 (S401). The user can use their customer device 120 to log onto the service of the virtual mail manager 100 using their user identifier and their password.

The user then enters the virtual mailing address identifier of the business or some other identifying information that enables the service to determine the virtual mailing address identifier (S402). This other identifying information may include the name of the business.

The service of the virtual mail manager 100 determines whether the virtual mailing address identifier of the business exists (S403). The service can determine whether the business exists by comparing the entered virtual mailing address identifier against a list of known virtual mailing address identifiers of businesses. These known virtual mailing addresses identifiers may be stored within a business table. The business table is updated whenever a business registers with the service to set its physical mailing address or logs onto the service to change its physical mailing address. During the registration of the business, the business is assigned a virtual mailing address identifier like the user.

If the virtual mailing address identifier of the business does not exist in the business table, the service sends an error message to the user (S404). The user is then given the opportunity to enter a new virtual mailing address identifier or a new business name.

If the virtual mailing address identifier of the business does exist, then the service updates the user's list of business contacts (S405). The user's list of business contacts may include an entry for each business that includes the virtual mailing address identifier of the business. The virtual mailing address identifier of the business in the user's list of business contacts can be used to index into the business table to determine the physical mailing address of the business.

The process may further include determining the security preferences of the user (e.g., User A) (S406). The security preferences of the user are initially created when the user registers with the service and may be changed by the user thereafter. The security preferences indicate whether the user is allowing one or more businesses to view their physical mailing address to receive advertisements, for example.

If the user's security preferences indicate the business is allowed to view their physical mailing address, the service marks the user (e.g., User A) as active in a list of the corresponding business (S407). The business has access to the physical mailing address of only the users listed as being active.

The business is also marked as being active in a list of the user (e.g., User A) (S408). In an exemplary embodiment, the service presents the physical mailing address of the business to the user only after the business has been marked as active.

The marking of the business as being active may precede the marking of the user as active.

If the security preferences of the user did not give access of the user's physical mailing address to the business, then step S406 is skipped and the process proceeds directly to step S407 so that the business can be marked as being active without give access of the user's physical mailing address to the business.

Since most letters and mail are not generated by institutions such as banks, insurance companies, health agencies, and governments, an identity management system can be maintained for those institutes. The identity management system can maintain a unique identifier that identifies each institution (e.g., an institutional identifier). The institutional identifiers may need to be publicly accessible and searchable. To strengthen the security for institutional identifiers, the institutional identifiers may be implemented as public key certificates from a certificate authority (e.g., a virtual mailing service provider, the post office, etc.). A private key certificate can be stored at the institute side to allow access to the service in the future to query for the real physical mailing addresses using a business to business (B2B) communication.

FIG. 5 illustrates a process of a business registering with the service according to an exemplary embodiment of the invention. The registration process of the business includes the business device 130 providing business registration information to the service (S501). The business registration information may include the name of the business and the physical mailing address. The business device 130 and the service then exchange public or private encryption keys (S502). Information communicated between the business and a virtual address service provided by the virtual mail manager 100 may be encrypted using the public and private encryption keys. The virtual mail manager 100 then assigns the business a virtual mailing address identifier and registration is completed (S503). In an alternative embodiment of the registration process, the business provides its virtual mailing address identifier to the service in step S501. Additional requests by the business to the service of the virtual mail manager 100 are digitally signed by the business and verified before revealing any user information.

FIG. 6 illustrates a process to enable a business to access a physical mailing address of a user according to an exemplary embodiment of the invention.

The process includes the business device 130 of a business logging onto the service of the virtual mail manager 100 (S601). For example, a user of the business may need to enter a business identifier (e.g., an institutional identifier) and a password to log onto the service.

After the business has logged onto the service, the business requests the physical mailing address of a user (S602). The request may include the business entering the virtual mailing address identifier of the user.

The service of the virtual mail manager 100 verifies the authenticity of the business (S603). This verification may include use of an encryption key or certificate sent by the business device to the service.

If the service cannot authenticate the business, then the service sends an error message to the business (S604).

If the service can authenticate the business, then the service determines whether the virtual mailing address identifier in the request exists (S605). This determination can be performed by comparing the entered virtual mailing address identifier against a list of known virtual mailing address identifiers.

If the virtual mailing address identifier does not exist, the service sends an error message to the business (S606).

If the virtual mailing address identifier does exists, the service checks the security preferences of the user associated with the virtual mailing address identifier (S607).

If the check indicates that no contact between the user and business is allowed, the service sends an error message to the business indicating it is unable to retrieve the physical mailing address or more specifically that the user's physical mailing address is private (S608).

If the check indicates that contact is allowed, the service presents the physical address of the user to the business (S609).

The business can also make a general request for all the physical mailing addresses of the users the business is entitled to access. The service can then perform a query of its database 110 to determine which users have given access of their physical mailing address to the business. The service can then present to the business the physical mailing addresses of all the users determined to have given access to the business.

The business (e.g., an institution) can use secure business-to-business (B2B) communications to access the virtual mailing services of the virtual mail manager 100. The secure communication may be ensured by the key certificate of the institution. Mailing address synchronization could be proactive or reactive. For a proactive approach, the business queries the virtual mailing service of the virtual mail manager 100 with a fixed time interval to determine whether physical mailing addresses have changed or to retrieve physical mailing addresses the business has been newly granted access to. In this way, the addresses of its customers will be updated automatically. The proactive approach can also be performed by the virtual mail manager 100 as a service to the business. For example, the virtual mail manager 100 can periodically perform the query for the business and send the changes to the business electronically or update an internal database of the business directly. In the reactive approach, an address change is sent to the business in response to a user changing his or her address, and that user having granted access of their address to that business. These changes may be sent to the business by the virtual mail manager 100 by applying a call-back to an API of the business. The changes may also be sent to the business using email.

In case a friend of a user wants to send a physical letter to that user, the friend can go to website managed by the virtual mail manager 100. Then the friend can log onto their account and the latest physical mailing addresses will be displayed if the friend has valid access control to a given virtual mailing address identifier. The friend may also receive changes or updates to the list of physical mailing addresses automatically via an email. The email addresses of the friends of a user can be maintained in a profile of the user.

The virtual mail manager 100 can maintain a data structure or data object that represents a virtual mailing address of a user or a business. The data object stores a virtual mailing address identifier, a private address, public information, and private information. The private address is the physical mailing address of the user or business. The public information is information that is to be exposed in public such as contact information. The contact information may include e-mail addresses and phone numbers. The private information may include additional contact information.

Figure 7:
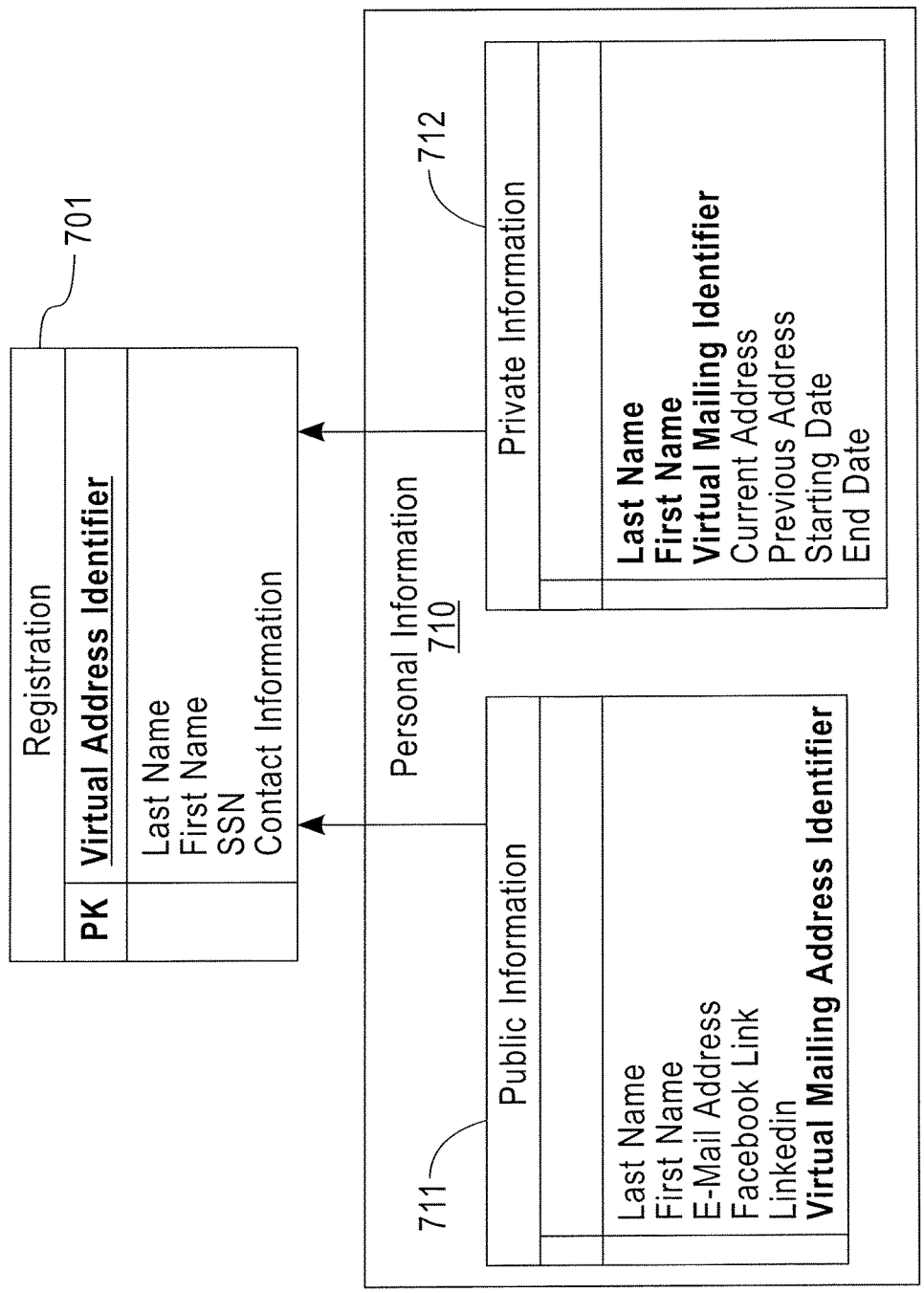
FIG. 7 illustrates an exemplary data object that can be used to represent a virtual mailing address in the system.

FIG. 7 illustrates an example of a data object that could be used to represent a virtual mailing address of a user. Referring to FIG. 7, the data object includes a registration section 701 and personal information section 710 that includes a public information section 711 and a private information section 712. The registration section 701 includes the virtual mailing address identifier of the user, the last name, the first name, the social security number, and contact information of the user. If the last name, first name, or virtual mailing address identifier is present in the public information section 711, that information is public. If the last name, first name, or virtual mailing address identifier is present in the private information section 712, that information is private. For example, the public information section 711 may indicate that an e-mail address, a FACEBOOK link, and a LINKEDIN link of the user are public. For example, the private information section 712 may indicate that current address, a previous address, a starting date, and an end date are private. The starting date may indicate when the current address is active (e.g., the date the user has moved to the current address). The end data may indicate the last date the address is active (e.g., the last date the user will be residing at the current address).

The information of the virtual mailing addresses may be maintained at both the virtual mail manager 100 and the individual institute sides. The registration service side (e.g., the virtual mail manager 100) can maintain the identifier of the institutional users, including their certificates for accessing services of the virtual mail manager 100. The institutional users can maintain the list of their valid clients, including the virtual mailing address identifiers.

Figure 8:
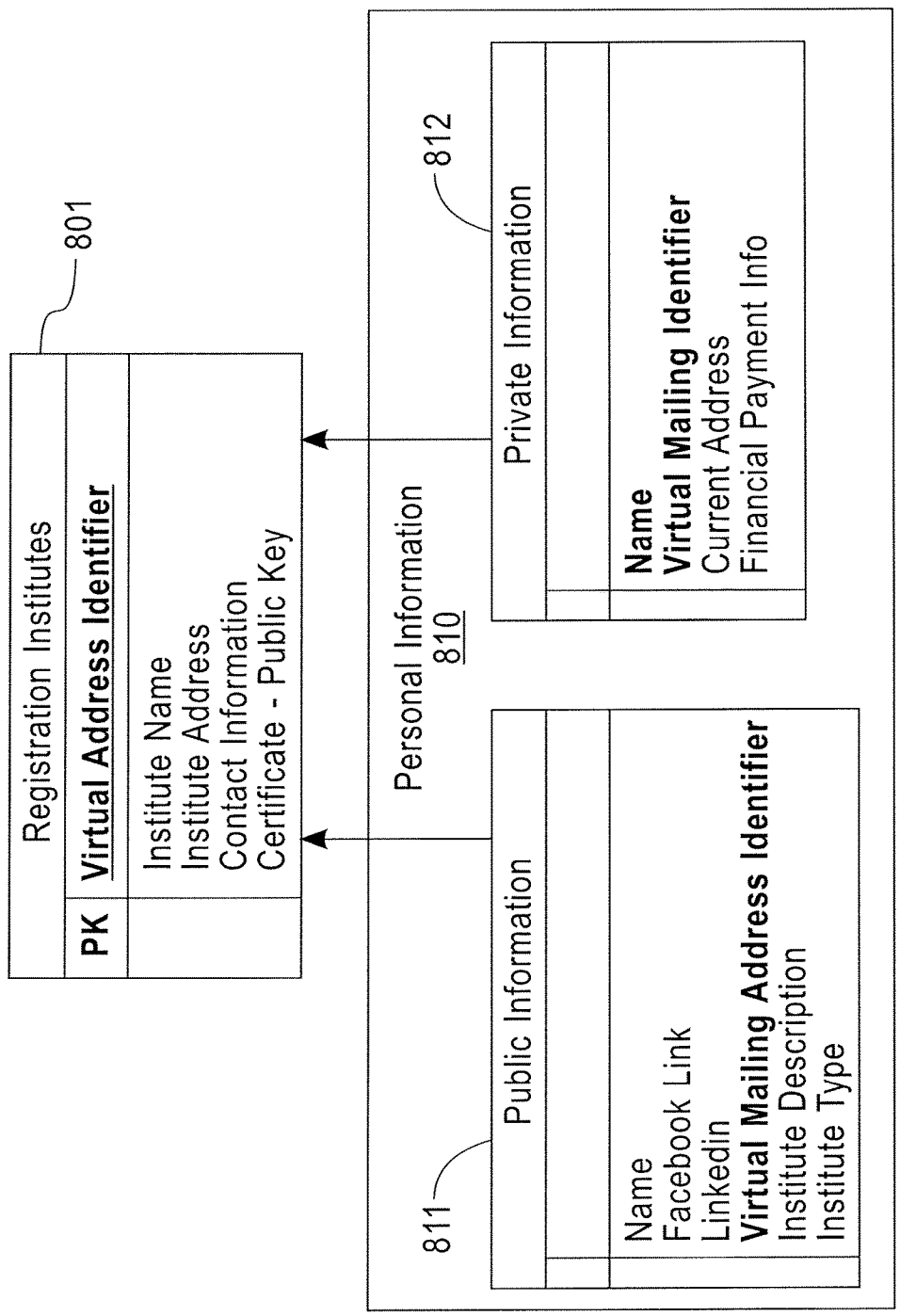
FIG. 8 illustrates an exemplary data object that can be used to represent a virtual mailing address in the system.

FIG. 8 illustrates an example of a data object that could be used to represent a virtual mailing address of a business or an institution (institute). Referring to FIG. 8, the data object includes a registration section 801 and personal information section 810 that includes a public information section 811 and a private information section 812. The registration section 801 includes the virtual address identifier, the name, the address, contact information, a certificate (e.g., public key) of the institute. If the name or virtual mailing address identifier is present in the public information section 811, that information is public. If the name or virtual mailing address identifier is present in the private information section 812, that information is private. For example, the public information section 811 may indicate that a FACEBOOK link, a LINKEDIN link, an institute description, or an institute type of the institute are public. For example, the private information section 812 may indicate that a current address or financial payment information of the institute are private.

The service of the virtual mail manager 100 may include a registration service, a publication service, a discovery service, an add service, a change service, and an access service. The registration service allows individual or institute users to create their records in the system. The publication service allows the system to publish the public information for future search by the users. Public description information is created when an individual or institute user is created. The discovery service allows individual users and institutes (through B2B communication) to search for potential friends and business institutes based on the public description information records.

The add service provides the features that allow the individuals (not institutes) to search the public information to find their friends. If their friends have public contact information, such as an e-mail address or a phone number, then they can communicate with a separate communication channel outside of the system to obtain their mutual virtual mailing address identifier. Once the individual enters their friend's virtual mailing address identifier, then his friend is granted access to the real physical mailing address of the individual.

For the institute, the individual user can make a search first, and then select the proper institute he trusts. The virtual mailing address identifier will be automatically added into the list of trusted institutes. The trusted institutes are then granted access to the real physical addresses of the individual.

The change service provides a function that enables a user or institute to change their physical address and other public and private information (including contact information).

The access service provides a function that enables access to the real physical addresses of the trusted partners (including individuals and institutes). The access service could be web access or through an API of the institute or a third-party application.

Embodiments of the invention require zero change to the current postal office workflow. Due to adoption of invention, the number of letters mislabeled with the wrong address can be reduced dramatically. For example, since those that adopt the invention will be notified of the address changes, the letters will have the correct address before they are sent out. Further, embodiments of the invention grants security control and privacy control to the individuals and not to the Post Office.

At least one embodiment of the invention allows a user to control the time range a person can view the physical mailing address of the user. This can be implemented using a certificate containing the information of the time range and an encryption key to retrieve the stored address and display the stored address in a given language (e.g., English). For example, once the current time is outside the range, the physical mailing address is no longer viewable.

Figure 9:
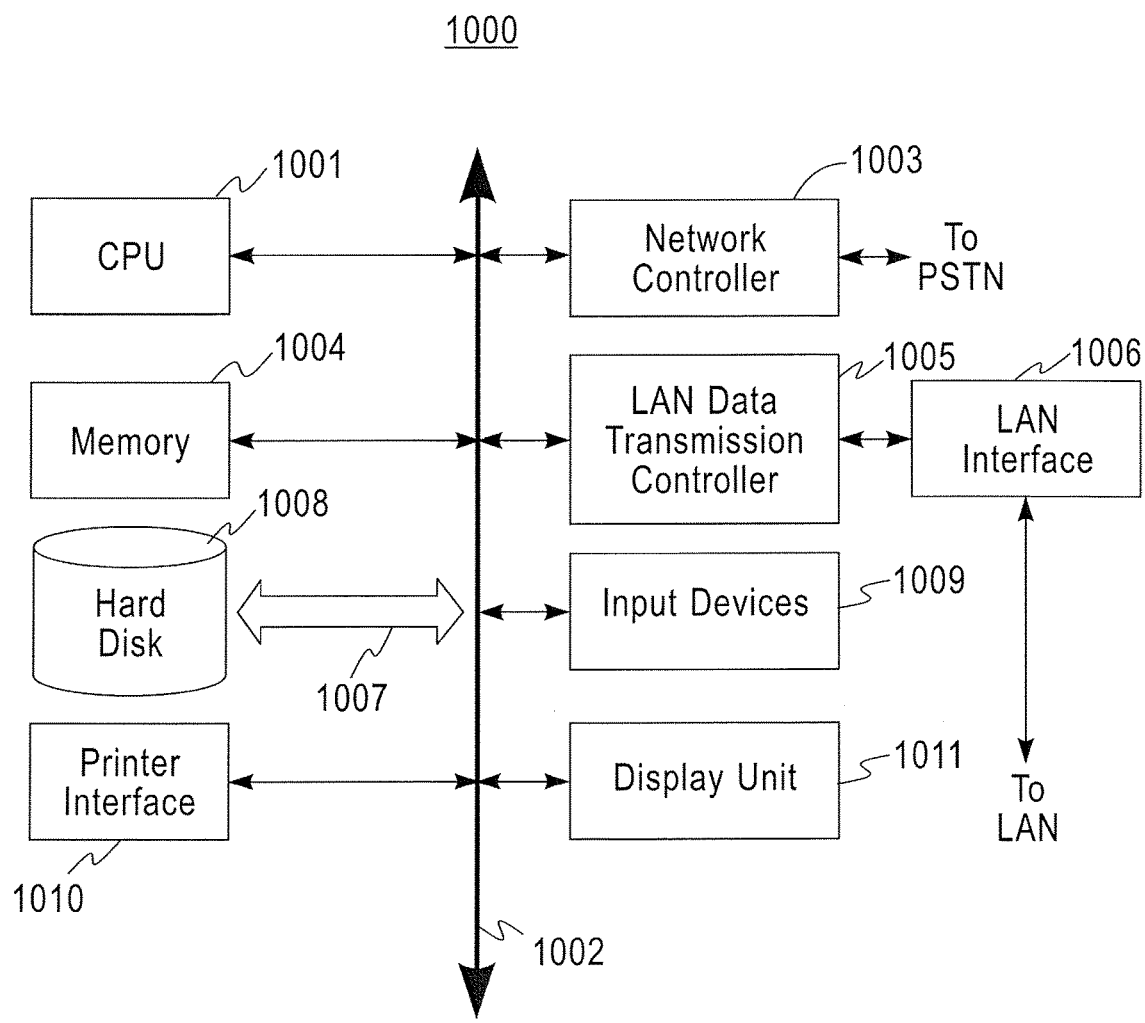
FIG. 9 illustrates an example of a computer system capable of implementing methods and systems according to embodiments of the disclosure.

FIG. 9 illustrates an example of a computer system, which may be used to implement any one of the devices or servers shown in FIG. 1 or execute any of the above-described methods, according to exemplary embodiments of the invention. For example, the methods of FIGS. 2-6 may be implemented in the form of a software application running on the computer system. Further, portions of the methods may be executed on one such computer system, while the other portions are executed on one or more other such computer systems. Examples of the computer system include but are not limited to a mainframe, personal computer (PC), a handheld computer, and a server. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

Referring to FIGS. 1-9, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, C++, Smalltalk, or the like, and conventional procedural programming languages, such as the Python, C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of maintaining an accurate physical mailing address using a virtual mailing address, method comprising:

assigning, by a server, a virtual mailing address identifier to a first user upon the first user registering with the server;

linking, by the server, the virtual mailing address identifier with a first physical mailing address of the first user entered by the first user during the registering to generate the virtual mailing address;

changing, by the server, the virtual mailing address by linking the virtual mailing address identifier with a second physical mailing address different from the first mailing address upon receiving a request from the first user to change a physical mailing address of the first user to the second physical mailing address;

enabling, by the server, a second user to access the physical mailing address associated with the virtual mailing address when the server determines that the second user has permission to access the virtual mailing address; and notifying the second user that the first user has changed the first physical mailing address to the second physical mailing address when the server links the virtual mailing address identifier with the second physical mailing address and the second user has permission to access the virtual mailing address, wherein the first physical mailing address corresponds to a current residence of the user and the second physical mailing address corresponds to a future residence of the user.

2. The method of claim 1, wherein the second user is a natural person or a juristic person associated with an institute or business or entity.

3. The method of claim 1, further comprising sending physical mailing address associated with the virtual mailing address to the second user in response to a request from the second user for the physical mailing address of the first user when the second user has permission to access the virtual mailing address.

4. The method of claim 1, wherein the second user has permission to access the virtual mailing address upon the second user inputting the virtual mailing address identifier assigned to the first user to the server.

5. The method of claim 1, wherein the second user has permission to access the virtual mailing address upon the second user inputting the virtual mailing address identifier assigned to the first user to the server and if the first user has previously input a virtual mailing address identifier assigned to the second user to the server.

6. The method of claim 1, wherein the second user of a juristic person has permission to access the virtual mailing address upon the second user creating a business identifier identifying an institute or business that is associated with the virtual mailing address identifier of the juristic person.

7. The method of claim 1, wherein the second user of a juristic person has permission to access the virtual mailing address upon the second user inputting the virtual mailing address identifier assigned to the first user to the server and if the first user has previously input a virtual mailing address identifier associated with the institute or business assigned to the second user of the juristic person to the server.

8. The method of claim 7, further comprising the server sending accurate contact information of the first user to the institute or business when privacy settings of the first user indicate contact between the second user of the juristic person associated with the business is allowed.

9. A computer program product for maintaining an accurate physical mailing address using a virtual mailing address, the computer program product comprising a computer readable storage medium having program code embodied therewith, the program code executable by a processor, to perform method steps comprising instructions for:

assigning, by a server, a virtual mailing address identifier to a first user upon the first user registering with the server;

linking, by the server, the virtual mailing address identifier with a first physical mailing address of the first user entered by the first user during the registering to generate the virtual mailing address;

changing, by the server, the virtual mailing address by linking the virtual mailing address identifier with a second physical mailing address different from the first mailing address upon receiving a request from the first user to change a physical mailing address of the first user to the second physical mailing address;

enabling, by the server, a second user to access the physical mailing address associated with the virtual mailing address when the server determines that the second user has permission to access the virtual mailing address; and notifying the second user that the first user has changed the first physical mailing address to the second physical mailing address when the server links the virtual mailing address identifier with the second physical mailing address and the second user has permission to access the virtual mailing address, wherein the first physical mailing address corresponds to a current residence of the user and the second physical mailing address corresponds to a future residence of the user.

10. The computer program product of claim 9, the method steps further comprising sending the physical mailing address associated with the virtual mailing address to the second user in response to a request from the second user for the physical mailing address of the first user when the second user has permission to access the virtual address.

11. The computer program product of claim 9, wherein the second user has permission to access the virtual mailing address upon the second user inputting the virtual mailing address identifier assigned to the first user to the server.

12. A computer system to maintain an accurate physical mailing address using a virtual mailing address, the system comprising:

a memory storing a computer program;

a processor configured to execute the computer program, wherein the program is configured to assign a virtual mailing address identifier to a first user upon the first user registering with the computer system;

link the virtual mailing address identifier with a first physical mailing address entered by the first user during the registering to generate the virtual mailing address;

change the virtual mailing address by linking the virtual mailing address identifier with a second physical mailing address different from the first physical mailing address upon receiving a request from the first user to change a physical mailing address of the first user to the second physical mailing address;

enable a second user to access the physical mailing address associated with the virtual mailing address when the computer system determines that the second user has permission to access the virtual mailing address; and notify the second user that the first user has changed the first physical mailing address to the second physical mailing address when the server links the virtual mailing address identifier with the second physical mailing address and the second user has permission to access the virtual mailing address,
wherein the first physical mailing address corresponds to a current residence of the user and the second physical mailing address corresponds to a future residence of the user.

13. The computer system of claim 12, wherein the computer program is configured to send the physical mailing address associated with the virtual mailing address to the second user in response to a request from the second user for the physical mailing address of the first user and the second user has permission to access the virtual mailing address.

14. The computer system of claim 12, wherein the second user has permission to access the virtual mailing address upon the second user inputting the virtual mailing address identifier assigned to the first user to the server.

15. The method of claim 1, wherein the server determines that the second user has the permission when a security preference of the first user is public or when the security preference is private and a list associated with the second user includes the virtual mailing address identifier.

16. The method of claim 1, wherein the virtual mailing address includes a date that indicates when the second physical mailing address is active.

17. The method of claim 1, wherein the virtual mailing address includes a link to a social network and the server determines that the second user has the permission when the first and second user are friends on the social network.

* * * * *